United States Patent [19]
Terreta

[11] Patent Number: 5,092,076
[45] Date of Patent: Mar. 3, 1992

[54] PLANTER EDGING LANDSCAPING SYSTEM

[76] Inventor: Joseph P. Terreta, 206 Telegraph Rd., Brownsville, Pa. 15417

[21] Appl. No.: 637,612

[22] Filed: Jan. 4, 1991

[51] Int. Cl.⁵ .............................................. A01G 1/00
[52] U.S. Cl. .......................................... 47/33; 52/102
[58] Field of Search ....................... 52/102; 47/33, 25; 404/7

[56] References Cited

U.S. PATENT DOCUMENTS

| | | | |
|---|---|---|---|
| 2,782,561 | 2/1957 | Smith | 47/33 |
| 2,865,136 | 12/1958 | Scott | 52/102 |
| 4,969,289 | 11/1990 | Trifiletti | 47/33 |

*Primary Examiner*—John E. Murtagh
*Attorney, Agent, or Firm*—H. Jay Spiegel

[57] ABSTRACT

The present invention relates to an improved planter edging landscaping system. In a first embodiment, the planter edging landscaping system includes a planter wall edging member which may be installed along wall structures or the like to create a planter area as well as provide an edging lip for ease of grass trimming or shearing. In a second embodiment, the present invention includes a flexible wall structure which is combinable with an edging cap to create an edging system which is adaptable to varying terrain. In addition, the edging cap may have channels therein to facilitate the installation of plumbing, wiring or drainage channels in outside environments.

15 Claims, 10 Drawing Sheets

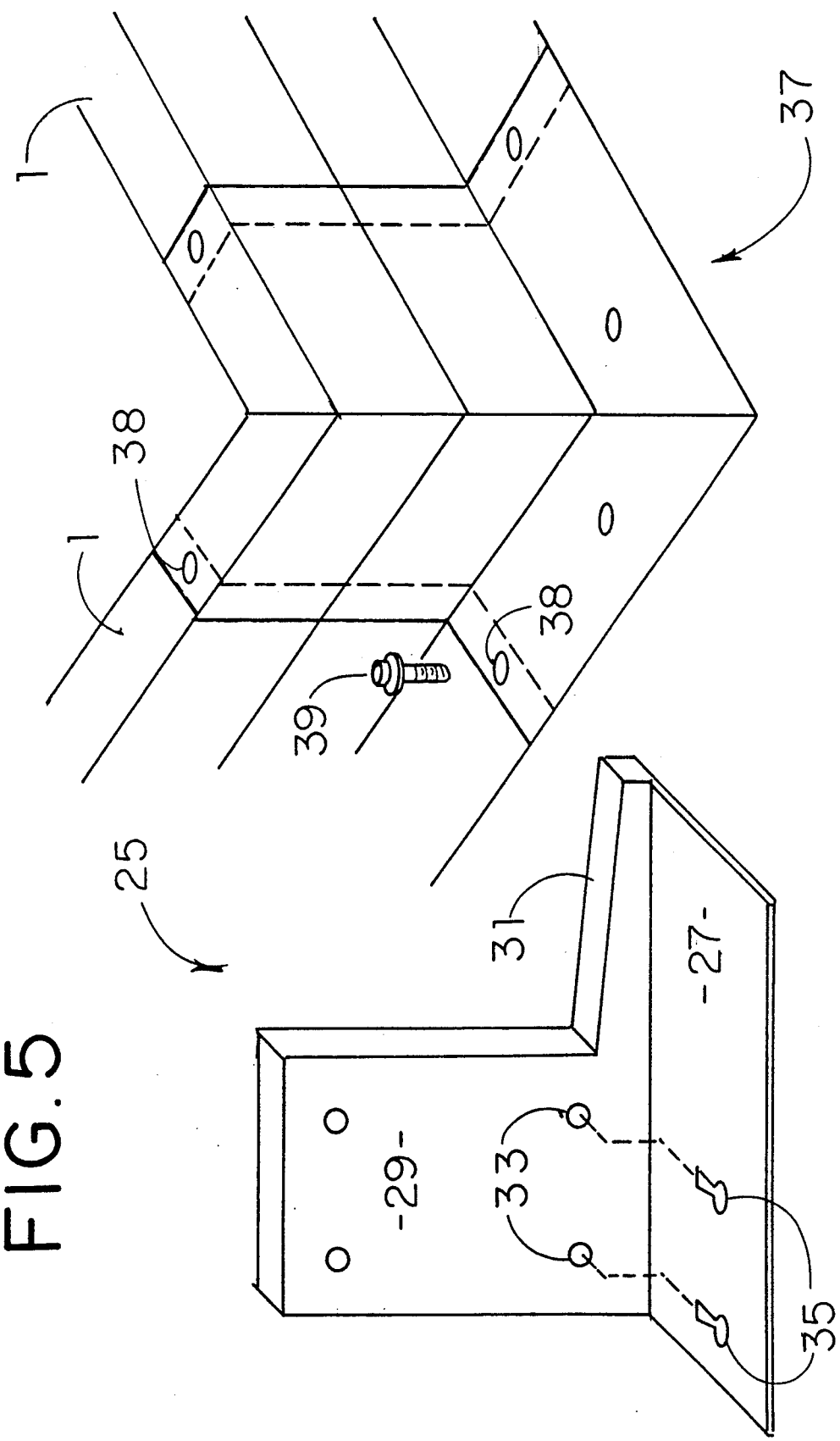

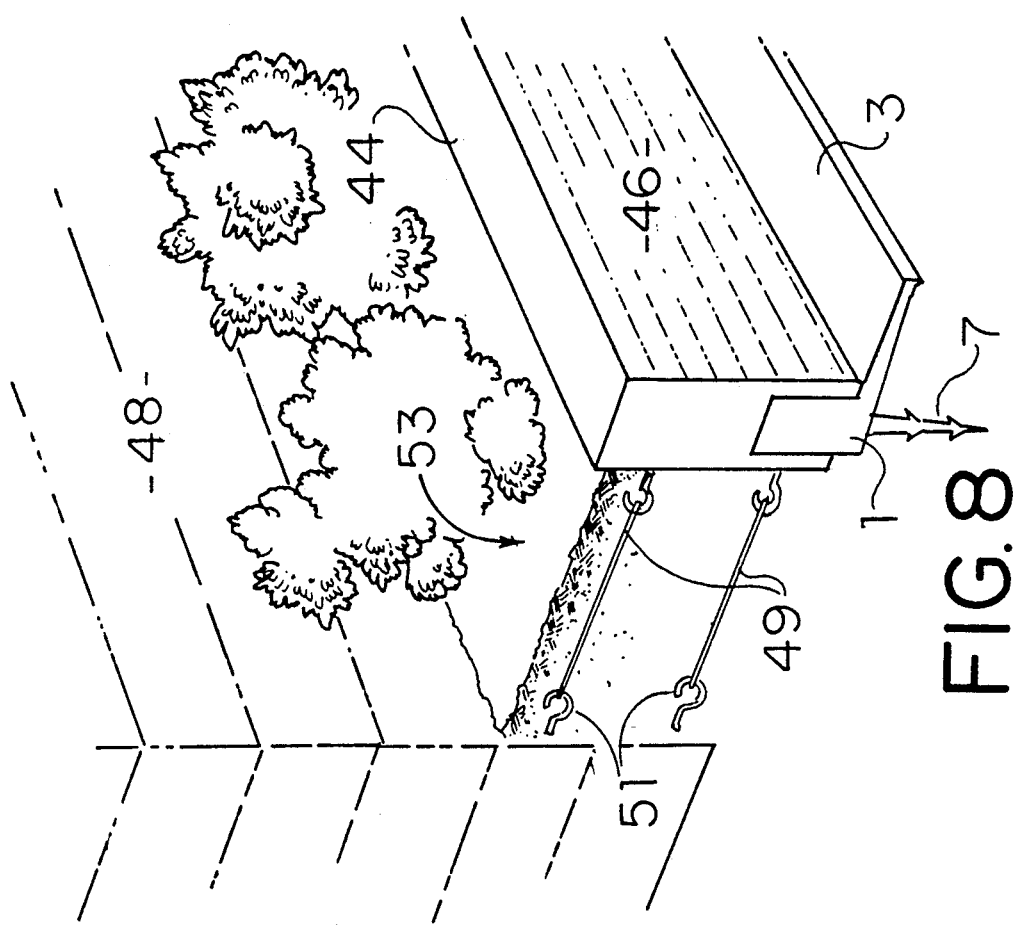
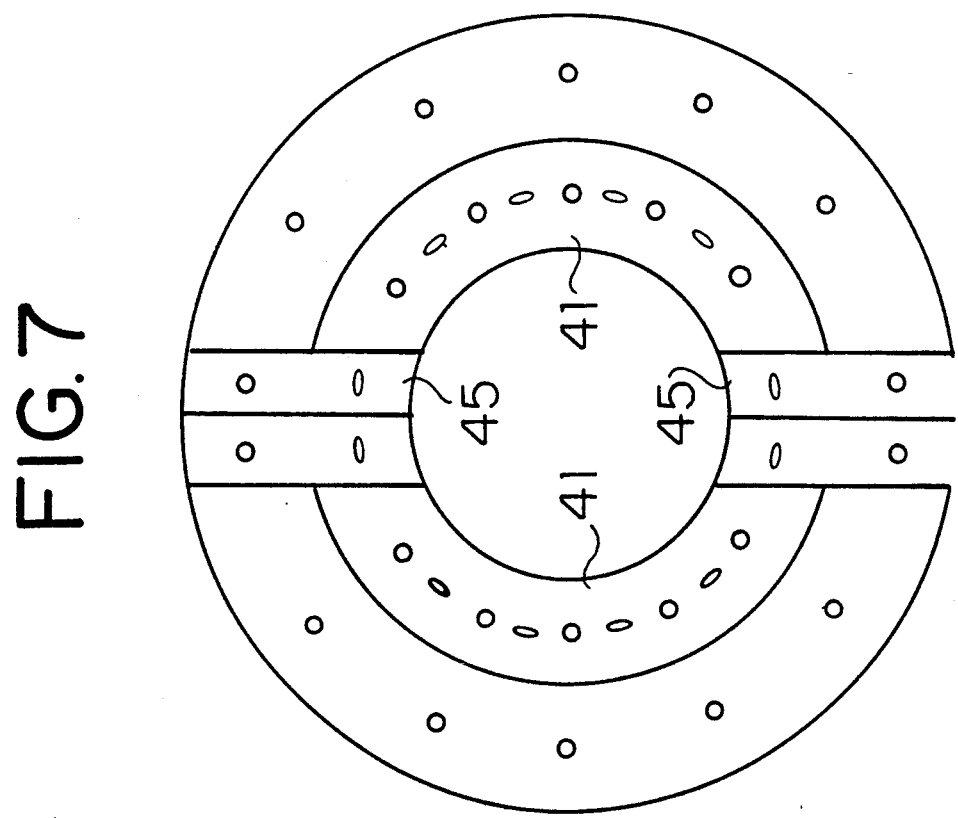
FIG. 8
FIG. 7

PLANTER EDGING LANDSCAPING SYSTEM

BACKGROUND OF THE INVENTION

The present invention relates to a planter edging landscaping system. The present invention provides a system which permits creating an edging structure for use along wall structures as well as a planter structure for landscaping purposes. Furthermore, the landscaping system includes embodiments which may be adapted for varying terrain and may facilitate the running of wiring, plumbing or the like in an outdoor environment.

In the prior art, systems for use in garden edging and landscaping are known. The following United States patents are known to Applicant:

U.S. Pat. No. 4,372,079 to Trageser discloses a garden edging system which includes an edging lip engaging a boundary member which is designed to be inserted in the ground. The teachings of this patent are different from that of the present invention in that Trageser does not teach or fairly suggest the combination of a boundary member and edging lip wherein the boundary member includes means to position the boundary member in the ground as well as means to attach the boundary member to an adjacent wall structure.

U.S. Pat. No. 4,663,883 to Hilliard et al. discloses a device which is designed to facilitate mowing of grass around a wall structure such as a fence. The teachings of Hilliard et al. are completely different from the present invention in that Hilliard et al. do not suggest an edging system which includes wall structure to permit creation of a planter or landscaping box.

U.S. Pat. No. 4,858,379 to West discloses another example of a landscaping edging member which creates a border along a wall structure to facilitate grass cutting. The teachings of West are different from that of the present invention in that West does not teach or fairly suggest a boundary or wall member which is designed to create a planter or landscaping enclosure.

SUMMARY OF THE INVENTION

The present invention relates to a planter edging landscaping system. The present invention includes the following interrelated aspects and features:

A) In a first aspect, and in a first embodiment, the planter edging landscaping system is designed to provide an edging device adjacent to a wall or other upright structure as well as a vertical wall structure to form an area that may be utilized as a planter for landscaping.

B) The planter edging landscaping system includes an elongated wall member having a generally rectangular cross-section and an edging lip extending outward along the length of the wall member.

C) The edging system may include coupling devices for connecting adjacent wall members together, end caps for terminating edges and outside corner coupling devices for connecting corners together. Alternatively, the planter edging system may be made of a corrugated material to facilitate using the system around corners, bends, uneven terrain or the like.

D) The edging system may also be made in semi-circular or circular shapes to facilitate landscaping in a semi-circular or circular manner.

E) In a second embodiment, an edging system is provided which includes a flexible elongated wall and an edging cap in combination therewith. The wall may be staked along the contour of a ground surface and the edging cap may be removably attached thereto to provide an edging system along with the wall structure.

F) The edging cap may include elongated channels therethrough to permit running wiring, plumbing, drain channels or the like along the flexible edging system. The cap may be constructed in the same manner as the flexible elongated wall to permit the edging cap to follow the contour of the flexible elongated wall and ground.

G) The flexible edging system may also include coupling devices to connect adjacent flexible walls together as well as coupling sleeves to interconnect adjacent channels in the edging cap.

Accordingly, it is a first object of the present invention to provide an improved planter edging landscaping system.

It is a further object of the present invention to provide a planter edging landscaping system which includes a wall structure and edging lip to facilitate the combination of an edging device and a planter or landscaping enclosure.

It is a still further object of the present invention to provide a flexible edging system which permits the edging system to follow the contour of uneven terrain as well as provide channels therein to permit running of plumbing, wiring or the like in an outside environment.

These and other objects, aspects and features of the present invention will be better understood from the following detailed description of the preferred embodiments when read in conjunction with the appended drawing figures.

BRIEF DESCRIPTION OF THE DRAWINGS

FIG. 5 shows an exemplary end cap for use in terminating edges with the embodiment shown in FIG. 1.

FIG. 6 shows a perspective view of an outside corner coupling for the landscaping system.

FIG. 7 shows a further embodiment of the planter edging landscaping system showing a semi-circular design.

FIG. 8 shows a perspective view of an additional embodiment of the planter edging landscaping system showing therewith a decorative planter facing.

SPECIFIC DESCRIPTION OF THE PREFERRED EMBODIMENTS

Figure 1:
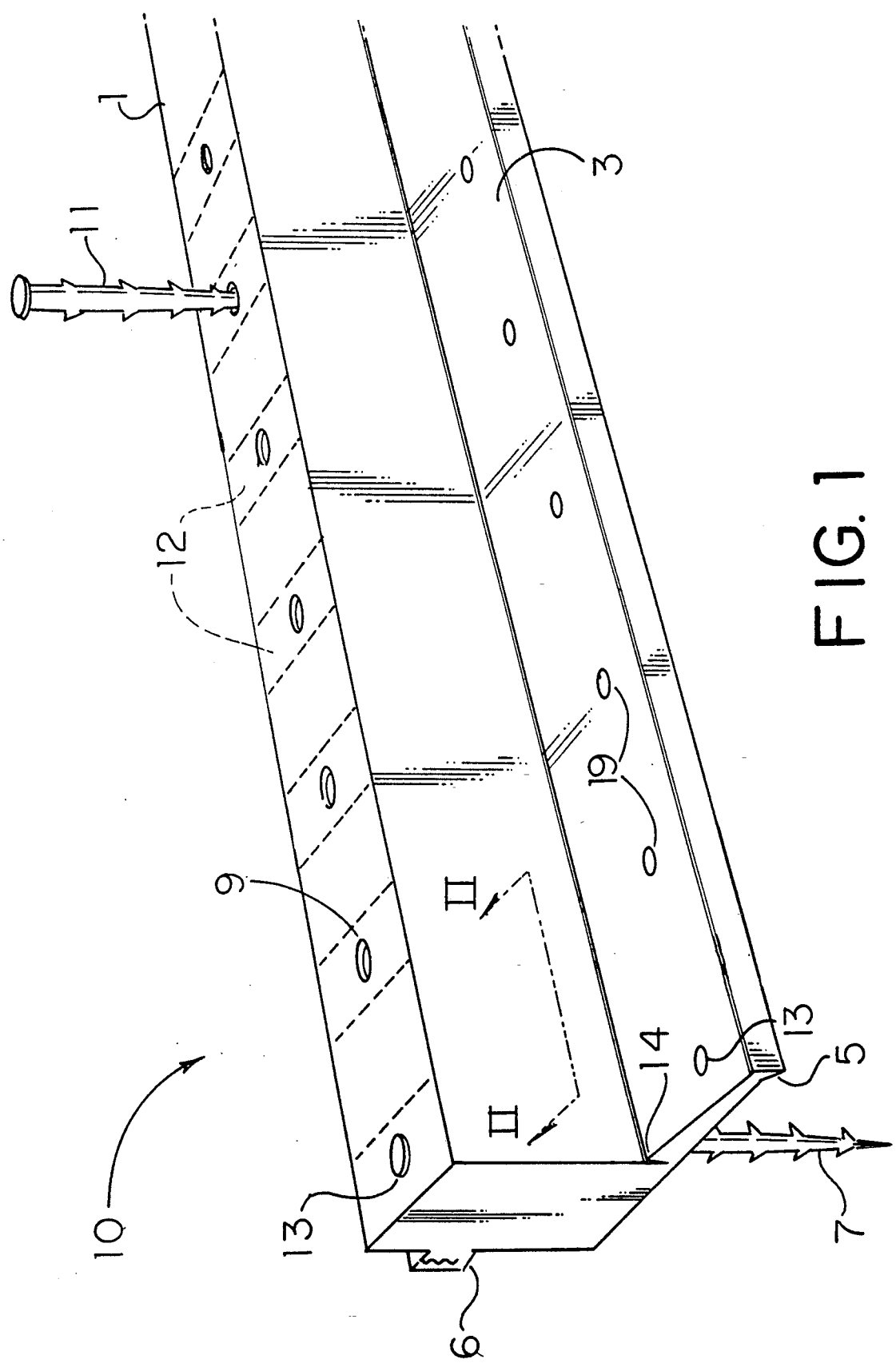
FIG. 1 shows a perspective view of a first embodiment of the planter edging landscaping system.
Figure 13:
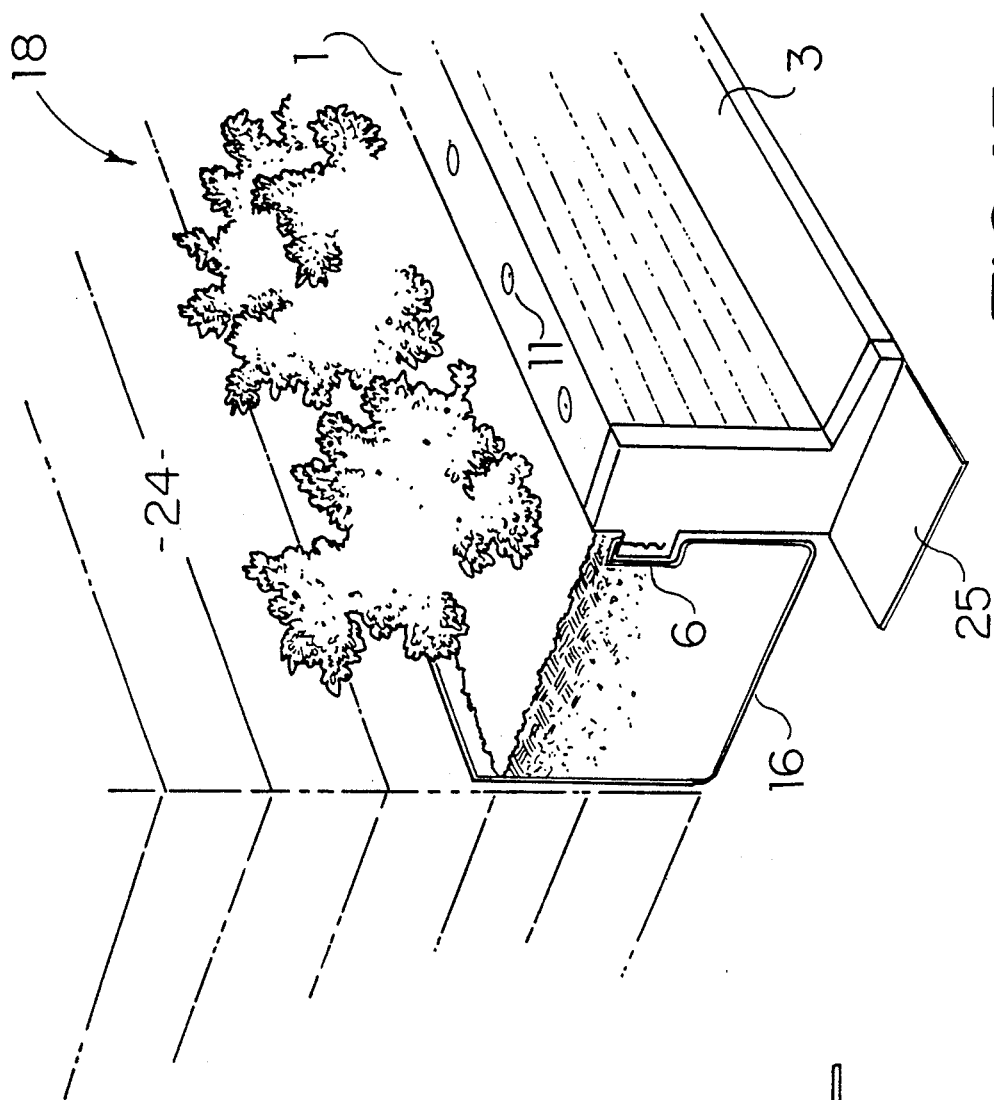
FIG. 13 shows an exemplary use of the planter edging landscaping system creating a planter box.

With reference to FIGS. 1 and 13 firstly, the present invention is generally designated by the reference numeral 10 and is seen to include an elongated wall member 1 and an elongated edging lip 3 attached thereto. As best seen from FIG. 13, the wall member 1 is designed as a retaining wall for use in a planter bed 18 which is located between the wall member 1 and a side wall structure 24. The wall member 1 includes double-back tape 6 attached to a face thereof which facilitates attaching a plastic liner 16 to the double-back tape 6 so as to form a liner for the planter area 18. Alternatively, the wall member 1 may be placed adjacent a wall structure such that the double-back tape 6 provides fastening means to the wall structure and the planter edger provides a border adjacent the wall structure.

Figure 3:
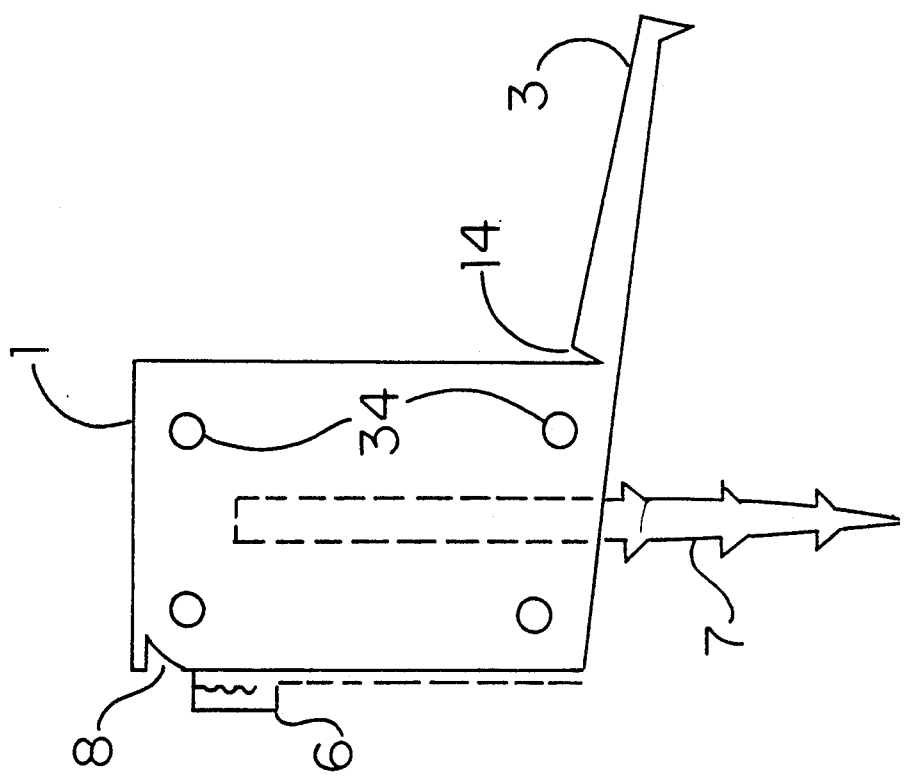
FIG. 3 shows a side view of the planter edging landscaping system shown in FIG. 1.

With reference to FIGS. 1 and 3, the wall member 1 includes a plurality of locating pins 7 extending from the bottom surface thereof. The locating pins are used to position the wall member in a desired configuration and orientation prior to permanently staking the wall member in the ground. In this way, an installer may secure the wall member in a desired fashion, observe the particular configuration from a distance while the wall member is sufficiently secured so as to not become misaligned during observation. An installer may then decide whether the particular configuration is desired as a final landscaping arrangement and attach the wall member in the ground in a more permanent fashion.

To facilitate attachment in a permanent fashion, the wall member has a plurality of openings 9 therethrough which are adapted to receive a staking pin 11, the staking pin 11 designed to pass through the wall member 1 and extend into a ground surface.

Figure 2:
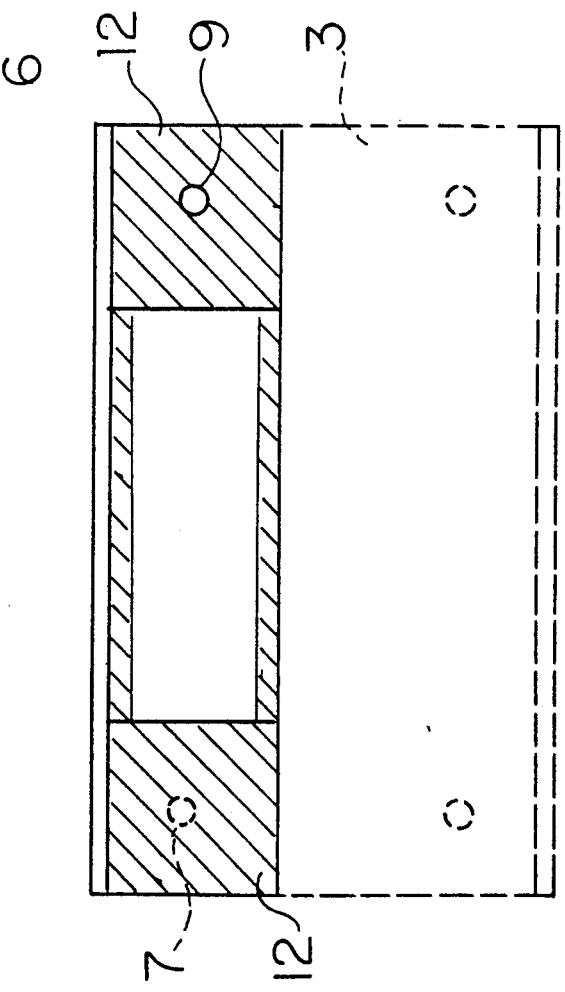
FIG. 2 shows a cross-sectional view along the line II—II of FIG. 1.

With reference to the cross-sectional view depicted in FIG. 2, the openings 9 in the wall member 1 are surrounded by a reinforced section 12 which provides strength and integrity to the wall member structure. The solid section 12 permits the wall member 1 to withstand flexing and straining as a result of the staking process. It should be understood that in an exemplary embodiment, the fastening pins 7 alternate along the length of the wall member with the staking pin openings 9. Furthermore, the reinforced sections 12 coincide with both the staking pin openings 9 as well as the section over the locating pins 7 so as to provide additional strength during the use of the locating pins.

With reference to FIGS. 1 and 3, the edging lip 3 is seen to include a terminating anchoring edge 5 which facilitates attachment of the edging lip in a ground surface. The edging lip 3 also includes a groove 14 therewith which permits the edging lip 3 to flex so as to accommodate different angles between the wall member 1 and edging lip 3. The edging lip also includes a plurality of openings 19 therein which facilitates staking the edging lip in a fixed position.

Figure 9:
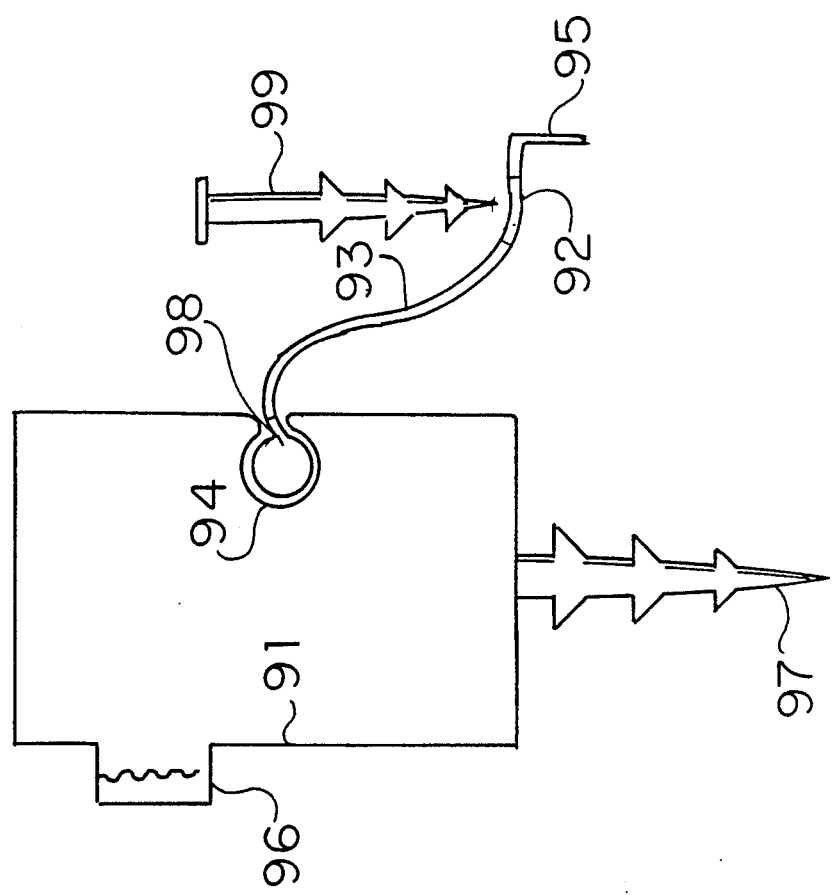
FIG. 9 shows an alternative embodiment of the edging lip for the planter edging landscaping system.

FIG. 9 shows an alternative embodiment of the edging lip 3. In this figure, a wall member 91 is shown with a groove 94 therein. The groove 94 is designed to receive an edging lip which is made up of a rubber section 93, a metal anchoring edge 95 and a metal swivel joint 98. The metal swivel joint 98 is designed to be inserted into the slot 94 in the wall member 91 so as to permit the edging lip 93 to rotate and accommodate different terrains. The anchoring edge 95 includes a plurality of openings 92 therein which are adapted to receive staking pins 99 to secure the edging lip in place.

Figure 4:
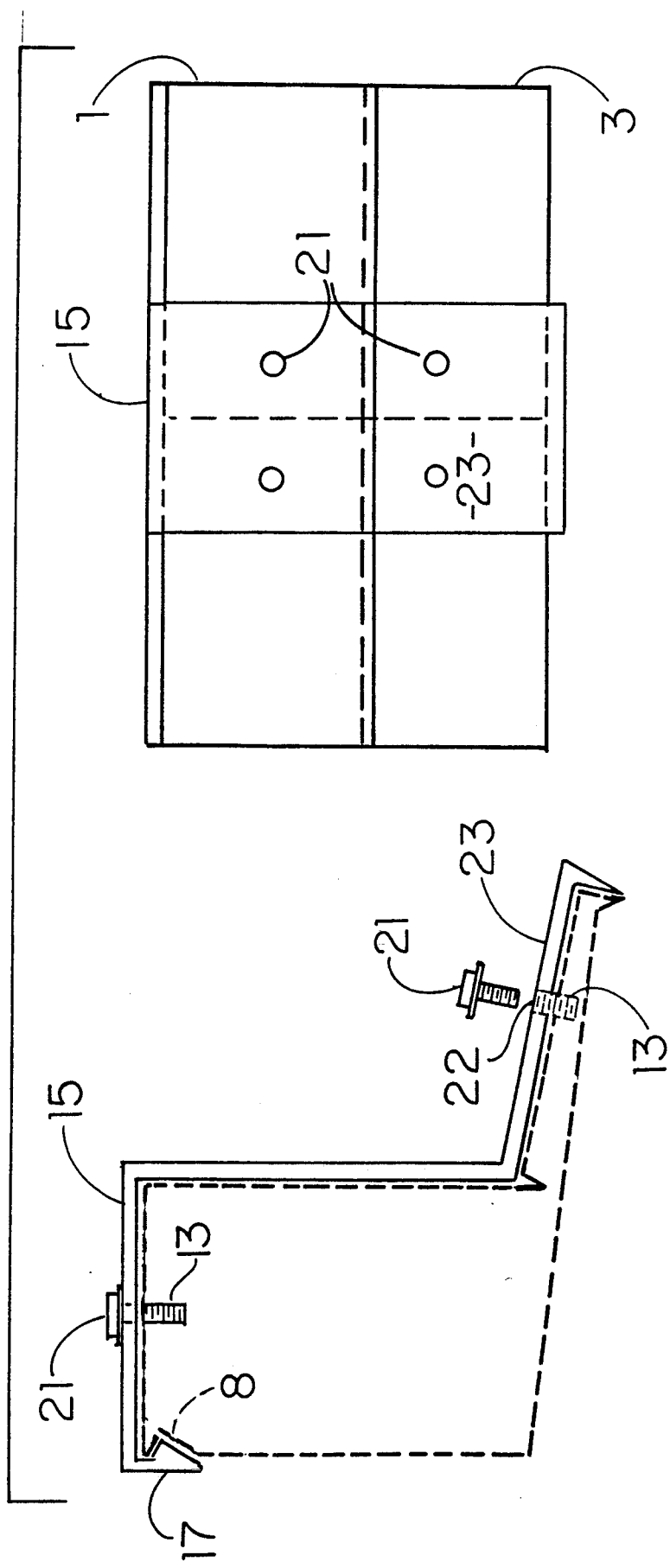
FIG. 4 shows a top view and a side view of a coupling sleeve for interconnecting links of the planter edging landscaping system shown in FIG. 1.

With reference to FIGS. 4 and 5, a coupling sleeve and end cap are depicted for use with lengths of the planter edging landscaping system. It should be understood that the planter edging landscaping system may come in any given length. The coupling sleeve 15, as seen in FIG. 4, is designed to interconnect adjacent planter edging systems together. The coupling sleeve 15 has an edging lip 23 which is designed to engage the edging lip 3 of the planter edging system and be attached using the fasteners 21 which extend through the opening 22 in the edging lip 23 of the coupling sleeve and the opening 13 in the edging lip 3. The top portion of the coupling sleeve has an edge 17 which is designed to engage the groove 8 in the wall member 1 and be attached to the wall member 1 in a similar fashion as the edging lip 23 is attached to the edging lip 3. The end cap 25 is designed to be attached to a terminating edge of the wall member 1 and edging lip 3 as best seen in FIG. 13. The end cap has an edging lip 27 thereon, an end cap portion 29 and a lip portion 31. The end cap portion 29 is designed to butt against the terminating edge of the wall member 1 with the lip portion 31 abutting the terminating edge of an edging lip 3. With reference back to FIG. 3 and FIG. 5, the end cap may be attached to the wall member 1 by the fasteners 35 extending through the openings 33 in the end cap portion 29 and into the openings 34 in the wall member 1.

Another type of coupling sleeve is shown in FIG. 6 wherein a pair of wall members 1 which are aligned ninety degrees with respect to each other may be connected with an outside corner coupling 37. The corner coupling 37 may be joined to the wall members using fasteners 39 engaging the openings 38 in the outside corner coupling 37 and the openings 13 in the wall member 1 and edging lip 3.

It should be understood by those skilled in the art that although the planter edging landscaping system is depicted as an elongated member as best seen in FIG. 1, other configurations may be utilized. FIG. 7 shows an exemplary embodiment wherein the planter edging landscaping system 41 is semi-circular in shape, a pair of planter edging systems 41 being connected together by couplings 45 so as to create a circular edging system. Furthermore, although the planter edging landscaping system has been shown as a generally rigid structure having a rectangular cross-section, a corrugated material either rectangular or circular in cross-section may be utilized for the wall member so as to accommodate changes in terrain. The edging lip 3 may also have a corrugated construction so as to accommodate changes in contour of the corrugated wall member.

Figure 16:
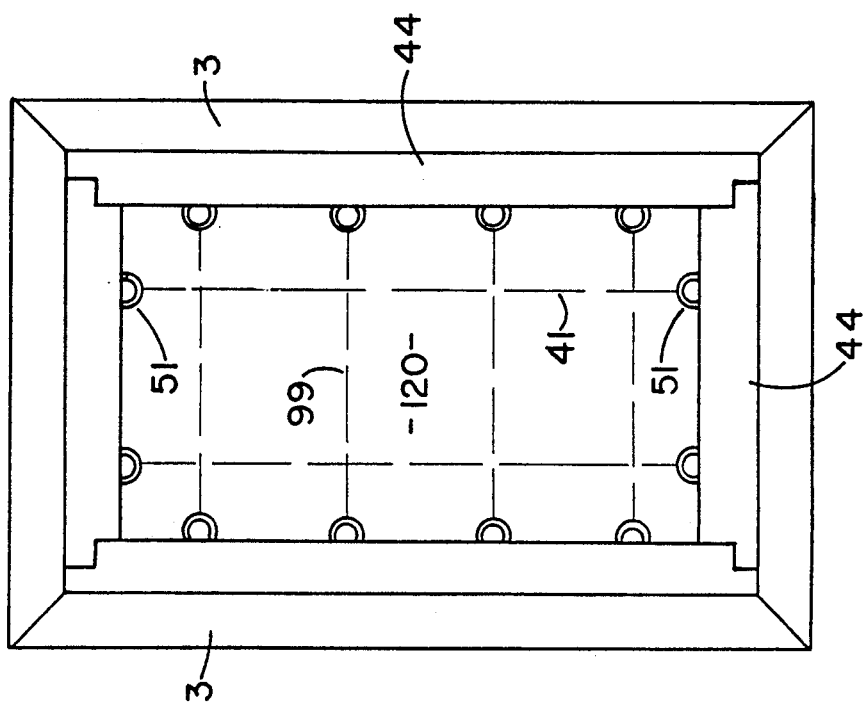
FIG. 16 shows a top view of another use of the planter edging landscaping system for a planter box.

In a further embodiment, the planter edging landscaping system comprising the wall member 1 and edging lip 3 may be used in combination with a decorative planter facing 44 as shown in FIG. 8. As can be seen from this drawing, the decorative planter facing 44 includes a brick-like facing 46 thereon to further vertically extend the planter box area 53. The decorative planter facing 44 may be secured to the adjacent wall structure 48 by a combination of eyelets 51 and connecting cables 49. Of course, other fastening means may be utilized to maintain the upward configuration of the decorative planter facing 44. Furthermore, other planter facings rather than the brick facade 46 shown may be utilized on the decorative planter facing, such as a stone or marble texture. Alternatively, and with reference to FIG. 16, the combination of the planter edger and decorative planter facing may be used to create a planter box. As shown in FIG. 16, opposing decorative facings 44 may be interconnected using the eyelets 51 and connecting cables 49 so as to create a planter area 120. The decorative wall facings 44 may be connected at the corners by each decorative wall facing being configured on an end portion thereof to create a ship lap joint, the joint being secured by fasteners (not shown).

Figure 10:
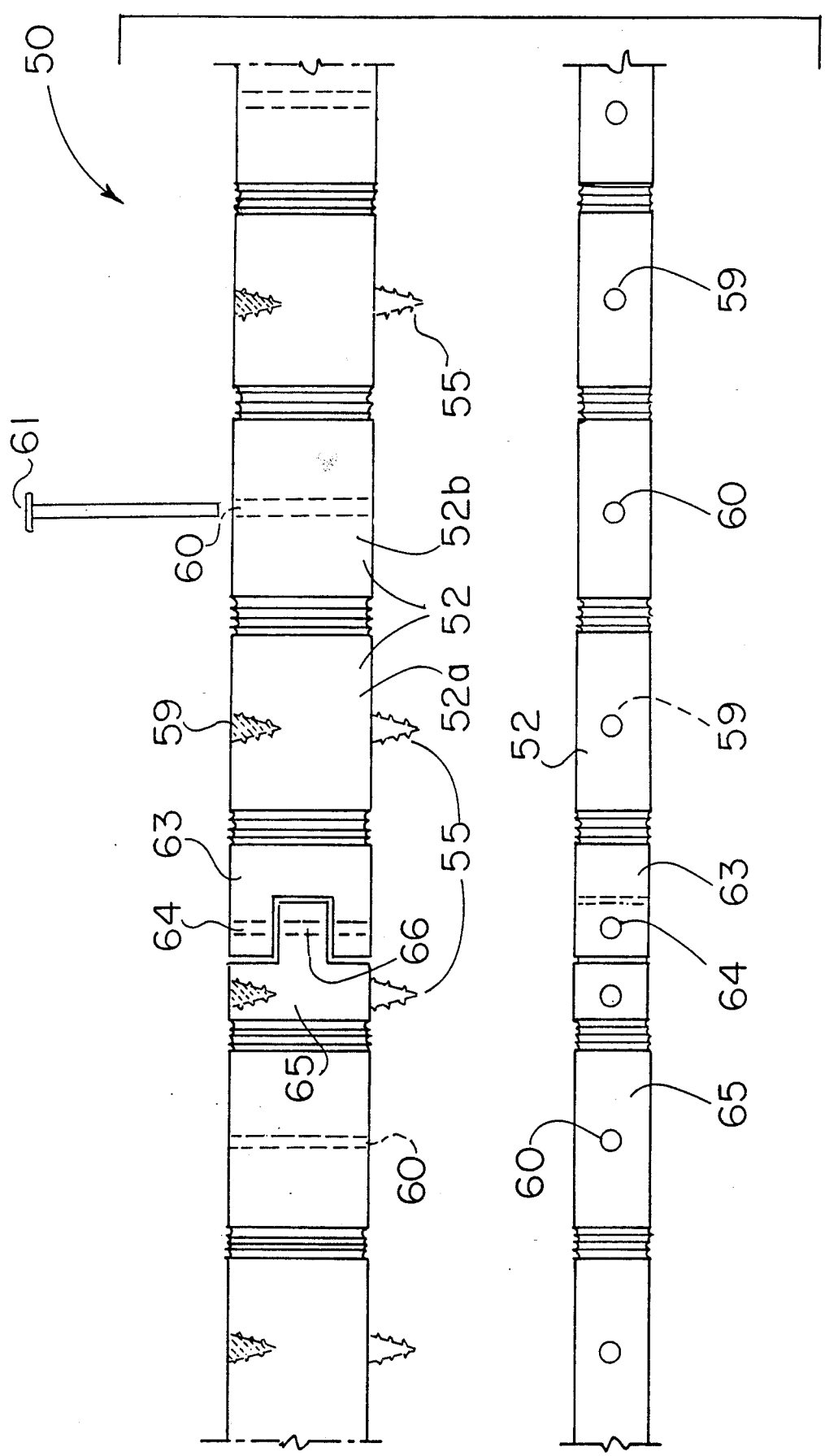
FIG. 10 shows a top view and a side view of the flexible edging system embodiment of the present invention.

In another embodiment of the present invention, the flexible wall of a flexible edging landscaping system is best seen in FIG. 10 and is generally designated by the reference numeral 50. The flexible wall 50 is seen to include a plurality of rigid sections 52 separated by corrugated sections 54 therebetween. Alternating sections 52a include a locating pin 55 which is designed to be used in the same manner as the locating pins described hereinabove for the planter edging landscaping system. The rigid sections 52b, in an alternating fashion, include an opening 60 therethrough which is designed to receive a staking pin 61 which stakes the flexible wall section 50 in place. Furthermore, alternating sections 52a include an opening 59 which is designed to receive a cap member described hereinafter. The flexible wall 50 may also include a coupling which comprises a male member 65 designed to engage a female member 63 by insertion of a pin through the opening 64 and 66 in the respective female and male members. This coupling facilitates joining a plurality of the flexible edging 50 together in any desired manner.

Figure 11:
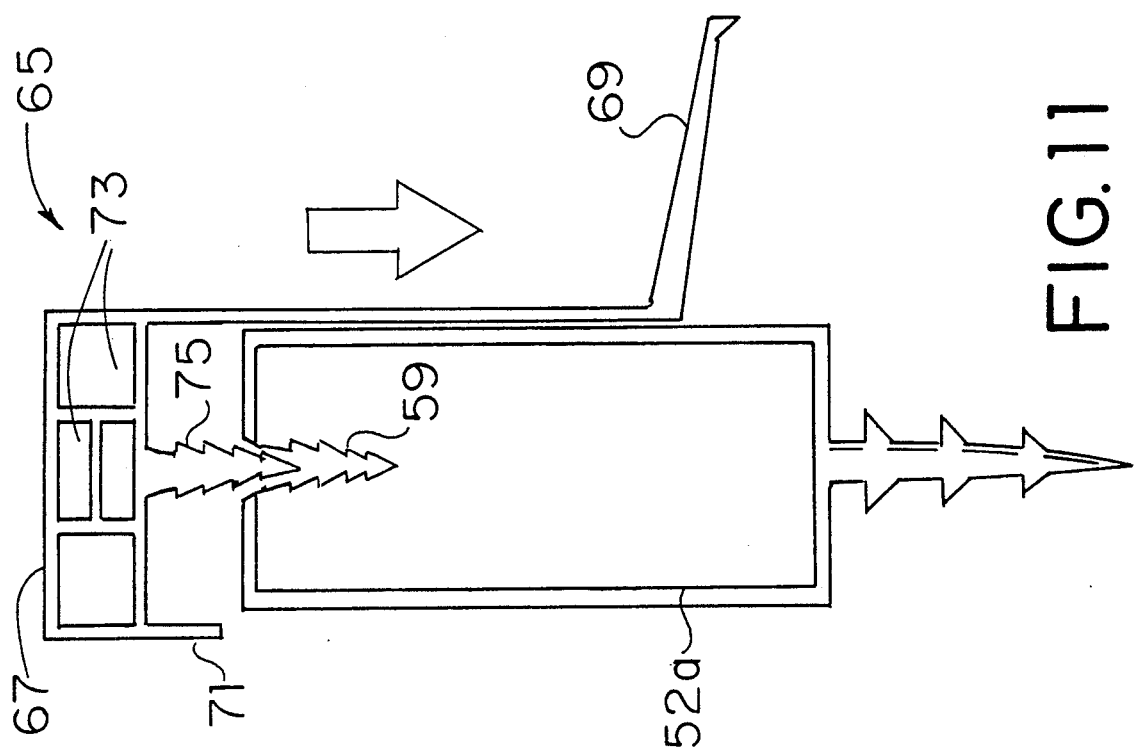
FIG. 11 shows a side view of the combination of an edging cap and the flexible wall shown in FIG. 10.
Figure 12:
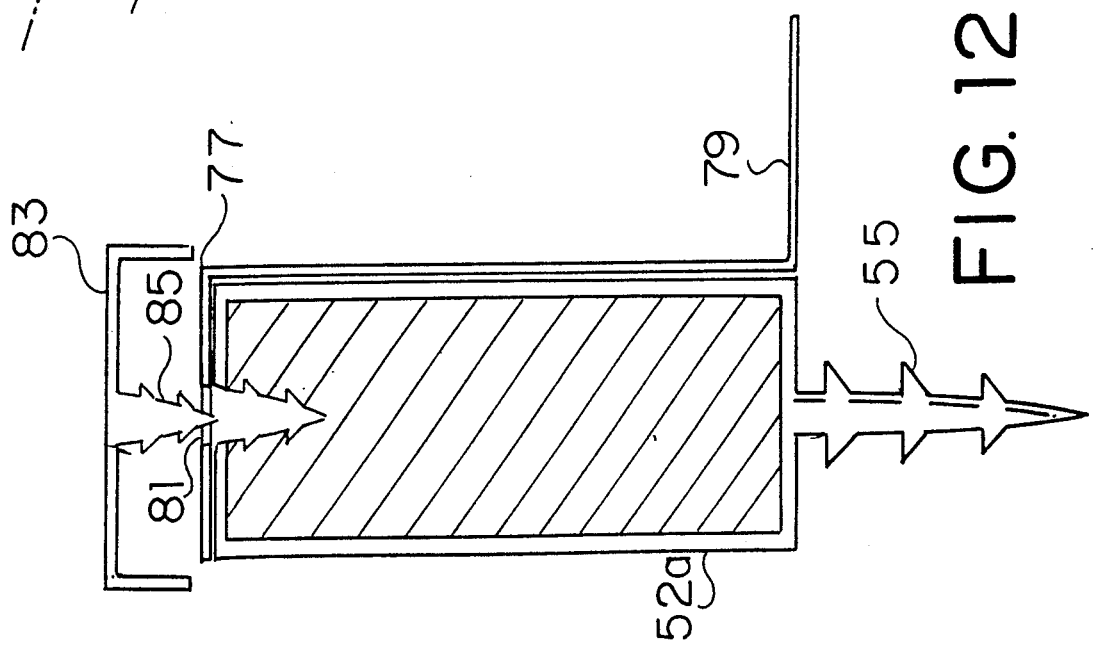
FIG. 12 shows an alternative embodiment of an edging cap in combination with the flexible wall shown in FIG. 1.

The flexible wall 50 is designed to be used in combination with a cap member as depicted in FIGS. 11 and 12. FIG. 11 illustrates a cap member 65 which includes a top cap portion 67 and an edging lip 69. The top cap portion 67 may include channels 73 therein which facilitate the running of wiring, plumbing, drainage channels or the like along the length of the cap. The cap 65 also includes a pin 75 which is designed to engage the opening 59 in the section 52a so as to secure the cap in place on the flexible edging 50. It should be understood, although not depicted, that the cap 65 is also made of a corrugated material so as to permit flexing with the flexible edging 50 along varying terrain.

In an alternative embodiment, FIG. 12 depicts an edging portion 77 having an edging lip 79 thereon which is designed to be attached to the flexible edging 50 by means of the cap 83. The cap 83 has a pin 85 thereon which extends through the opening 81 in the edging portion 77 and engages the opening 59 in the flexible edging section 52.

Figure 14:
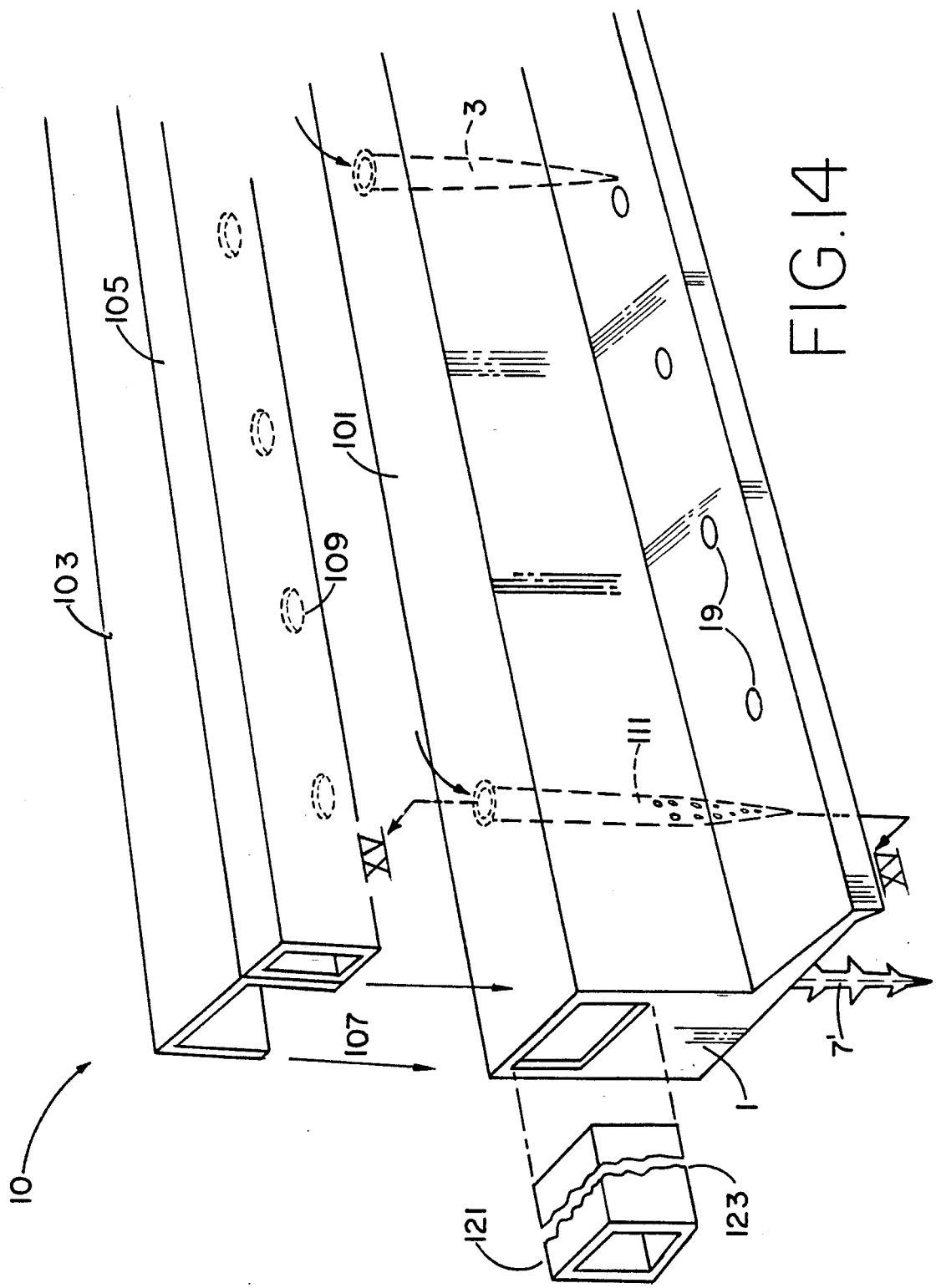
FIG. 14 shows a further embodiment of the planter edging landscaping system for chemical in-ground treatment.
Figure 15:
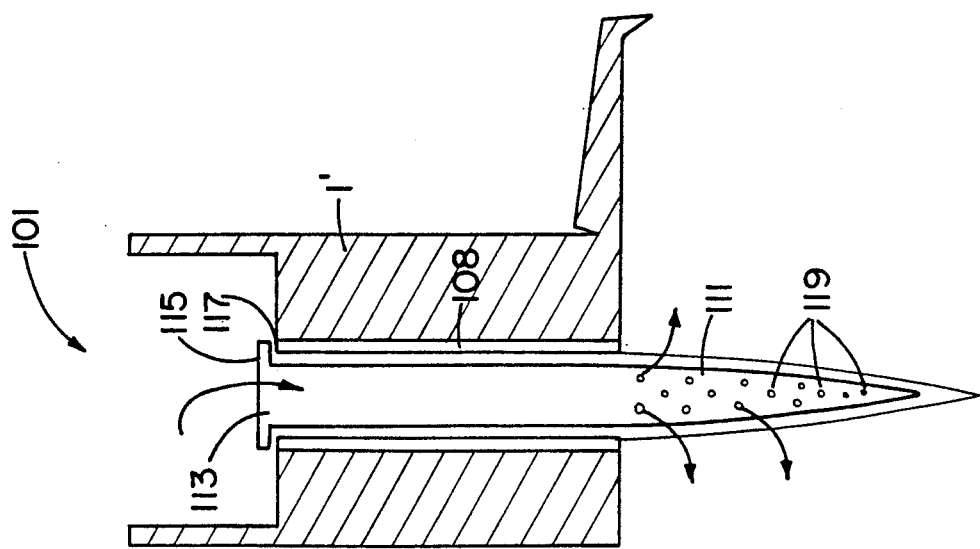
FIG. 15 shows a cross-sectional view along the line XV—XV of FIG. 14.

In a further embodiment, the planter edging landscaping system as depicted in FIG. 1 may be adapted to facilitate in-ground chemical treatment. As best seen in FIGS. 14 and 15, a planter edging landscaping system adapted for in-ground chemical treatment is generally designated by the reference numeral 10' and is seen to include a wall member 1', an edging lip 3' having a plurality of openings 19 therethrough to facilitate staking and locating pins 7'. The difference between the planter edging landscaping system depicted in FIG. 1 and the embodiment depicted in FIGS. 14 and 15 resides in a channel 101 created in the top portion of the wall member 1', the channel 101 being designed to channel fluids for chemical treatment into the ground. The wall member 1' includes a plurality of openings 108 therethrough, each opening 108 designed to receive a perforated stake 111 therethrough. The perforated stake 111 includes a lip portion 115 on the top end thereof which engages the base of the channel 101. The lip 115 may be sealed at the junction 117 by a sealant such as silicone or the like to ensure that any fluid in the channel 101 is directed through the opening 113 in the stake 111 and into the ground at a below the surface level. The stake 111 includes a plurality of perforations 119 in the bottom portion thereof, the perforations permitting any fluid directed into the channel 101 and hollow opening 113 in the stake 111 to flow into the ground beneath the wall member 1'.

The planter edging landscaping system 10, also includes a cap 1 member 103 which is designed to be inserted over the top portion of the wall member 1'. The cap portion includes a channel 105 which has an opening 107 running therethrough. The channel 105 is designed to receive electrical lighting with the lighting designed to align with the openings 109 in the channel 105.

Adjacent wall member 1' may be connected by the sleeve 121 fitting in the opening 122 in the wall member 1'. The sleeve 121 may include a silicone sealant 123 or the like therearound to ensure that any fluid in the channel 101 does not leak at the joint connections.

In use, the wall member 1' of the planter edging landscaping system may be first installed in a desired ground location. Thereafter, the perforated stakes 111 may be installed through the openings 108 in the wall member 1' and the cap member 103 installed thereafter. The planter edging landscaping system may be then used to treat the ground where the perforated stakes 111 are planted therein by filling the channel 101 with a fluid such that the fluid flows through the perforated stakes and out the perforations 119 into the ground. An example of a typical treatment could be treating termites around the periphery of a house or other structure. Of course, other chemical treatments for fertilization requirements or the like may be utilized.

In the flexible wall edging system, utilizing the edging cap 65, an edging system is provided which accommodates varying terrain as well as the ability to maneuver around objects such as trees, shrubs or building corners. Furthermore, the channels in the edging cap 73 allow the running of wiring, plumbing, drainage systems in an outside environment along the top of the flexible edging 50. The flexible edging system may be utilized along an adjacent wall structure, or may be used to create a planter box or landscaping area similar to the planter edging system. In addition, the flexible edging system may have an edging cap which provides two edging lips on either side of the flexible wall member.

The planter edging system or the flexible edging system may be made out of any materials with a preferred material being plastic or a flexible material such as rubber. The locating pins and staking pins may be made out of high impact materials such as metal, wood or high-strength plastics.

In a further embodiment, the wall member of the planter edging landscaping system may be constructed such that a hollow chamber exists which may be filled with weighted materials such as sand or concrete. In this manner, the planter edging landscaping system may be used as an abutment to a path or other walkway. In addition, the wall member 1 of the planter edging system may also include channels therein to facilitate the running of plumbing, wiring, drainage ways or the like along the planter edging landscaping system in a similar manner as the edging caps in combination with the flexible wall edging. Regarding these channels, interconnections between adjacent channel sections may be made by coupling sleeves designed to engage a section of each channel of each adjacent edging cap or wall member.

The edging lip of the landscaping system provides a means in which to control vegetative growth along a landscaping border or wall structure and permits adjacent grass to be easily mowed by the wheel of a lawn mower riding along the top of the edging lip. In this manner, no trimming or shearing of grasses or the like adjacent a vertical structure are required to maintain a neat landscaping appearance.

As such, an invention has been disclosed in terms of preferred embodiments thereof which fulfill each and every one of the objects of the invention as set forth hereinabove and provides a new and improved planter edging landscaping system of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A planter edging landscaping system for use in landscaping comprising:
   a) at least one elongated wall member having an elongated bottom surface, a pair of side surfaces and a top surface;
   b) an elongated edging lip attached to said wall member along a first side surface and generally forming a continuation of said bottom surface;
   c) a plurality of locating pins attached to said bottom surface at spaced apart intervals along a direction of elongation of said bottom surface, each of said locating pins being spaced from said side surfaces and being adapted to facilitate placement of a said wall member and edging lip prior to securing said wall member and edging lip in place;
   d) means to removably attach a said wall member to an adjacent vertical surface; and
   e) a plurality of vertically aligned openings extending through a said wall member at spaced apart intervals, each of said vertically aligned openings being adapted for receiving a staking device to secure a said wall member in place;
   f) whereby said wall member and said edging lip are adapted to create a border along a ground surface for landscaping purposes.

2. The invention of claim 1, wherein said edging lip is integrally attached to said wall member and further includes a grooved portion to facilitate flexing of said edging lip.

3. The invention of claim 1, wherein said planter edging landscaping system further comprises an elongated decorative planter facing member, said elongated decorative planter facing member further including:
   a) means to attach said elongated decorative planter facing member to an adjacent vertical surface; and
   b) means to attach a said elongated decorative planter facing member to a said top surface of a said wall member.

4. The invention of claim 1, wherein said planter edging landscaping system further includes coupling means to connect adjacent said wall members and edging lips together.

5. The invention of claim 1, wherein said wall member and said edging lip have a shape selected from the group consisting of circular or semicircular.

6. The invention of claim 1, wherein said edging lip includes an anchoring lip at the longitudinally terminating edge thereof for securing said edging lip in a ground surface.

7. The invention of claim 1, wherein said wall member and said edging lip are made of a plastic or resilient material.

8. A flexible edging landscaping system for use in landscaping purposes comprising:
   a) at least one elongated flexible wall member, said elongated flexible wall member having a side face, a rear face and a plurality of locating pins on a bottom face thereof spaced from said rear face and provided to facilitate placement of said elongated flexible wall member prior to securing in a fixed position; and
   b) at least one separate flexible edging cap comprising:
      i) a first lip portion being adapted to attach to a top face of said elongated flexible wall member; and
      ii) a second lip portion being adapted to provide an edging lip adjacent said bottom face of said elongated flexible wall member and a wall interconnecting said first and second lip portions and overlying said side face;
   c) whereby the combination of said elongated flexible wall member and flexible edging cap provides a flexible edging landscaping system that is adaptable to elevational changes in a ground surface as well as existing structures on said ground surfaces when placed in a fixed position on said ground surface.

9. The invention of claim 8, wherein said flexible edging cap further comprises a plurality of channels therein, each said channel being adapted to facilitate running electrical wiring, plumbing, or drainage passages therethrough for use in outdoor environments.

10. The invention of claim 8, wherein said flexible edging wall member comprises a plurality of rigid non-corrugated sections, adjacent said rigid sections being connected by a corrugated section.

11. The invention of claim 8, wherein said flexible edging cap and said flexible wall member are made of a plastic or resilient material.

12. The invention of claim 7, wherein said wall member and said edging lip are made of a plastic or resilient material.

13. A planter edging landscaping system for use in landscaping comprising:
   a) at least one elongated wall member having a bottom surface, a pair of side surfaces and a channel;
   b) an elongated edging lip attached to said wall member along a first side surface;
   c) a plurality of locating pins attached to said bottom surface at spaced apart intervals, each of said locating pins being adapted to facilitate placement of a said wall member and edging lip prior to securing said wall member and edging lip in place;
   d) means to removably attach a said wall member to an adjacent vertical surface;
   e) a plurality of vertically aligned openings extending through a said wall member at spaced apart intervals and in communication, each of said vertically aligned openings receiving a hollow perforated staking device to secure a said wall member in place and permit in-ground chemical treatment by a chemical treating fluid passing through said channel and said hollow perforated staking devices; and f) a cap designed to cover said channel;

g) whereby said wall member and said edging lip are adapted to create a border along a ground surface for landscaping purposes.

14. The invention of claim 13, wherein said cap includes a plurality of openings therein and a channel therethrough, said openings being adapted to receive illumination means and said channel being adapted to receive electrical conductors for said illumination means.

15. A planter edging landscaping system for use in landscaping, comprising:

a) at least one elongated wall member having an elongated bottom surface, a pair of side surfaces and a top surface;

b) an elongated edging lip pivotably attached to said wall member along a first side surface, said first side surface having a part cylindrical recess receiving a part cylindrical attachment structure of said edging lip for relative pivoting movements therebetween;

c) a plurality of locating pins attached to said bottom surface at spaced intervals along a direction of elongation of said bottom surface, each of said locating pins being spaced from said side surfaces and being adapted to facilitate placement of a said wall member and edging lip prior to securing said wall member and edging lip in place;

d) means to removably attach a said wall member to an adjacent vertical surface; and e) a plurality of vertically aligned openings extending through a said wall member at spaced apart intervals, each of said vertically aligned openings being adapted for receiving a staking device to secure a said wall member in place;

f) whereby said wall member and said edging lip are adapted to create a border along a ground surface for landscaping purposes.

* * * * *